United States Patent [19]

Goldberg et al.

[11] 3,946,432

[45] Mar. 23, 1976

[54] APPARATUS FOR DIGITALLY ENCODING A TELEVISION SIGNAL

[75] Inventors: Abraham A. Goldberg, Stamford, Conn.; John P. Rossi, Bronx, N.Y.

[73] Assignee: CBS Inc., New York, N.Y.

[22] Filed: Oct. 10, 1974

[21] Appl. No.: 513,616

[52] U.S. Cl........ 358/13; 178/DIG. 3; 340/347 AD; 325/38 R
[51] Int. Cl.².... H04N 9/33; G08C 5/00; H04B 1/00
[58] Field of Search............ 358/12, 13, 17, 19, 18; 178/DIG. 3; 325/38 B, 41, 38 R; 340/347 SH, 347 AD

[56] References Cited
UNITED STATES PATENTS

| | | |
|---|---|---|
| 3,653,014 | 3/1972 | List et al........................ 178/DIG. 3 |
| 3,720,780 | 3/1973 | Remy et al..................... 178/DIG. 3 |
| 3,800,225 | 3/1974 | Meares................................. 358/13 |

OTHER PUBLICATIONS
"Color Decoding a PCM NTSC TV Signal," Journal of the Society of Motion Picture and Television Engrs., Vol. 83, No. 6, June 1974, pp. 489–496 inc.

Primary Examiner—Robert L. Griffin
Assistant Examiner—R. John Godfrey
Attorney, Agent, or Firm—Spencer E. Olson

[57] ABSTRACT

An apparatus and method for digitally encoding an NTSC color television signal in a manner that facilitates comb filtering of the digitally encoded signal. In accordance with the invention there is provided a means for generating a first sampling signal having a characteristic frequency of three times the NTSC color subcarrier signal. Another means is provided for generating a second sampling signal having the same characteristic frequency, this second sampling signal having its sampling reference points interspersed equally in time between the sampling reference points of the first sampling signal. Enabling means, responsive to the NTSC color television signal, are provided for alternately enabling the first and second sampling signals during successive horizontal scanlines of the television signal. Further provided is a means, responsive to the enabled sampling signal, for sampling the television signal.

4 Claims, 3 Drawing Figures

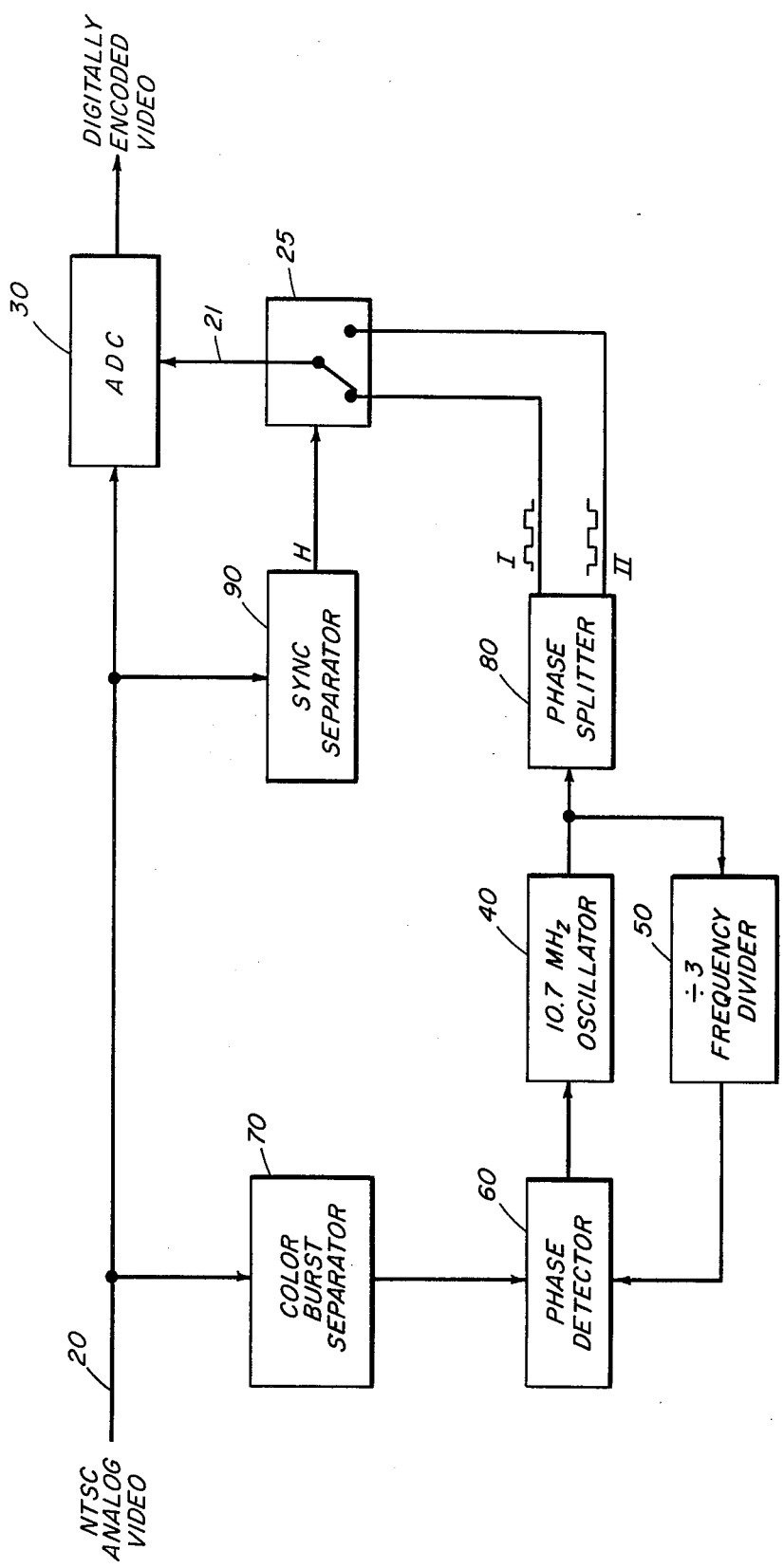

APPARATUS FOR DIGITALLY ENCODING A TELEVISION SIGNAL

BACKGROUND OF THE INVENTION

It is generally recognized that in the future an increasing percentage of television broadcasting plant processing techniques will be performed digitally. At present, color encoding and decoding in the digital domain are relatively costly operations because arithmetic operations must be performed at high speeds that tax the capabilities of existing logic hardware. However, as digital circuits and stores become faster and less expensive, the concepts of digital processing become increasingly practical.

An advantageous type of digital encoding for a color television signal employs a pulse-code modulation (PCM) encoding technique. In PCM, the modulating signal waveform is sampled at regular intervals and the samples are quantized into discrete steps. Only certain discrete levels are allowed within a specified range of expected sample values and these are represented in the system by means of a code pattern of a series of pulses that are typically in binary code. The number of allowed discrete levels is determined by the word length; e.g., 6 binary digits or bits permits 64 levels, 8 bits permits 256 levels, etc., so it is evident that both the resolution and the complexity of the system largely depend on the word length chosen. A PCM signal has the advantage of high immunity to the effects of channel noise and channel amplitude non-linearity.

Once a color television signal has been converted into digital form, such as by a PCM technique, it may be transmitted in this form and then converted back into an analog signal which is, in turn, decoded to obtain the baseband signals, I, Y and Q. It is envisioned, however, that there will be substantial advantage if one could readily decode a pulse-code modulated NTSC color television signal into digital versions of the I, Y, and Q baseband signals without first converting into the analog domain.

In color decoding a PCM NTSC signal, it is desirable that the digital sampling rate be a multiple of the subcarrier frequency, so that during sampling the phase relationship between the PCM sampling signal and the NTSC subcarrier would be known and consistent. This being the case, and considering the minimum constraints imposed by sampling theory, the most likely choices for a suitable sampling frequency are nominally 10.74 MHz. (precisely three times the color subcarrier frequency) or nominally 14.32 MHz (precisely four times the color subcarrier frequency). As between these choices, the 10.74 MHz. sampling frequency has the obvious advantage of requiring lower speed circuitry and lower storage requirements than the 14.32 MHz. sampling frequency. However, as will be demonstrated, there is an unfortunate problem associated with attempting to decode a digital NTSC color television signal that has been sampled at 10.74 MHz.

It is a desirable technique of television processing to separate the luminance and chrominance components of a composite NTSC signal by "comb filtering". A comb filter takes advantage of the frequency relationship between the horizontal line rate and the color subcarrier signal. As is well known, a typical comb filter utilizes three adjacent television lines in a given field and selectively adds and subtracts them to obtain the chrominance and luminance signals. Specifically, the typical analog comb filter combines three adjacent lines of a given field designated top (T), middle (M), and bottom (B), in the following proportions to obtain the chrominance (C) and the luminance (Y) signals:

$$C = M - (\tfrac{1}{2})(T + B)$$

$$Y = M + (\tfrac{1}{2})(T + B)$$

An examination of the function of an analog comb filter reveals that it effectively operates by sampling and averaging, with particular weighting coefficients, three picture elements from three adjacent lines. This sampling and averaging is repeated for all individual picture elements (a picture element being considered as an infinitesmal image sample). Thus, a digital PCM television signal would appear ideal for comb filtering since each digital code word describes the instantaneous amplitude of the analog signal at a particular sampling time. This is indeed the case for a PCM signal obtained by sampling at 14.32 MHz. (or an even multiple of the color subcarrier) since video samples on successive lines are separated by exactly one horizontal scan period. However, when the television signal is encoded at an odd multiple of the color subcarrier frequency, 10.74 MHz. for example, the digital samples on sequential lines are found to be vertically misaligned. As will be shown, this result follows from the odd multiple relationship between one-half the line rate and the color subcarrier frequency in the NTSC system. The misaligned samples render difficult the the comb filtering of a digital PCM TV signal that had been sampled at 10.74 MHz. Since 14.32 MHz. is the lowest usable even multiple that could be used as a sampling frequency, and this higher frequency is disadvantageous from the standpoint of storage size and circuit speed it would be desirable if the problem of comb filtering a digital television signal sampled at 10.74 MHz. could be solved. It is an object of the present invention to provide this solution.

SUMMARY OF THE INVENTION

The present invention is directed to an apparatus and method for digitally encoding an NTSC color television signal in a manner that facilitates filtering filering of the digitally encoded signal. In accordance with the invention there is provided a means for generating a first sampling signal having a characteristic frequency of three times the NTSC color subcarrier signal. Another means is provided for generating a second sampling signal having the same characteristic frequency, this second sampling signal having its sampling reference points interspersed equally in time between the sampling reference points of the first sampling signal. Enabling means, responsive to the NTSC color television signal, are provided for alternately enabling the first and second sampling signals during successive horizontal lines of the television signal. Further provided is a means, responsive to the enabled sampling signal, for sampling the television signal. Finally, means are provided for converting the sampled television signal into digital form.

In a preferred embodiment of the invention the first and second sampling signals are opposite phases of a square wave at 10.74 MHz.

Further features and advantages of the invention will become more readily apparent from the following detailed description when taken in conjunction with the accompanying drawings.

BRIEF DESCRIPTION OF THE DRAWINGS

FIG. 3 is a block diagram of an encoding apparatus in accordance with an embodiment of the invention.

DESCRIPTION OF THE PREFERRED EMBODIMENT

Figure 1:
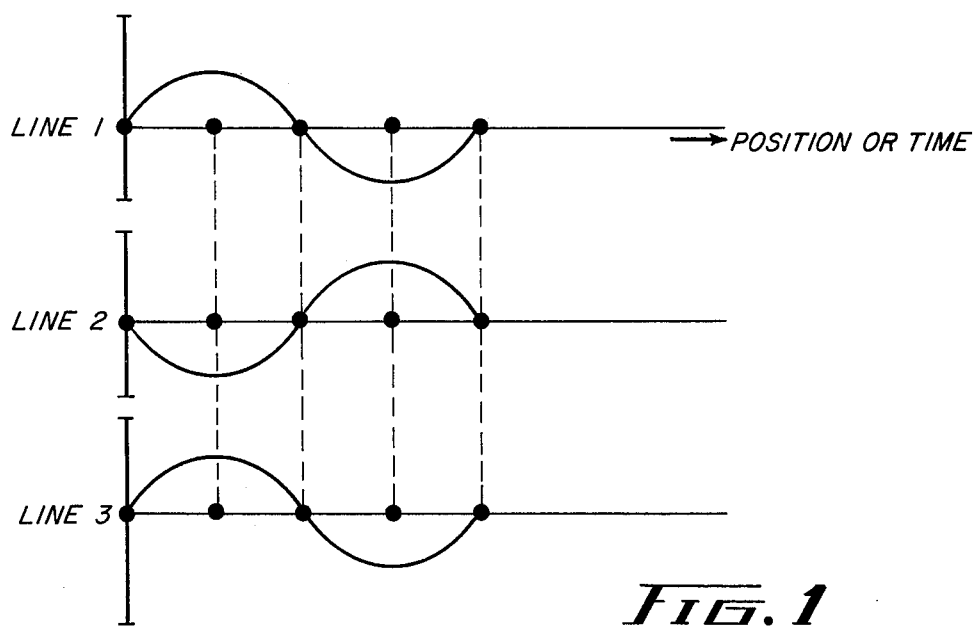
FIG. 1 is a graph of subcarrier signal and sampling points useful in understanding the background of the invention.
Figure 2:
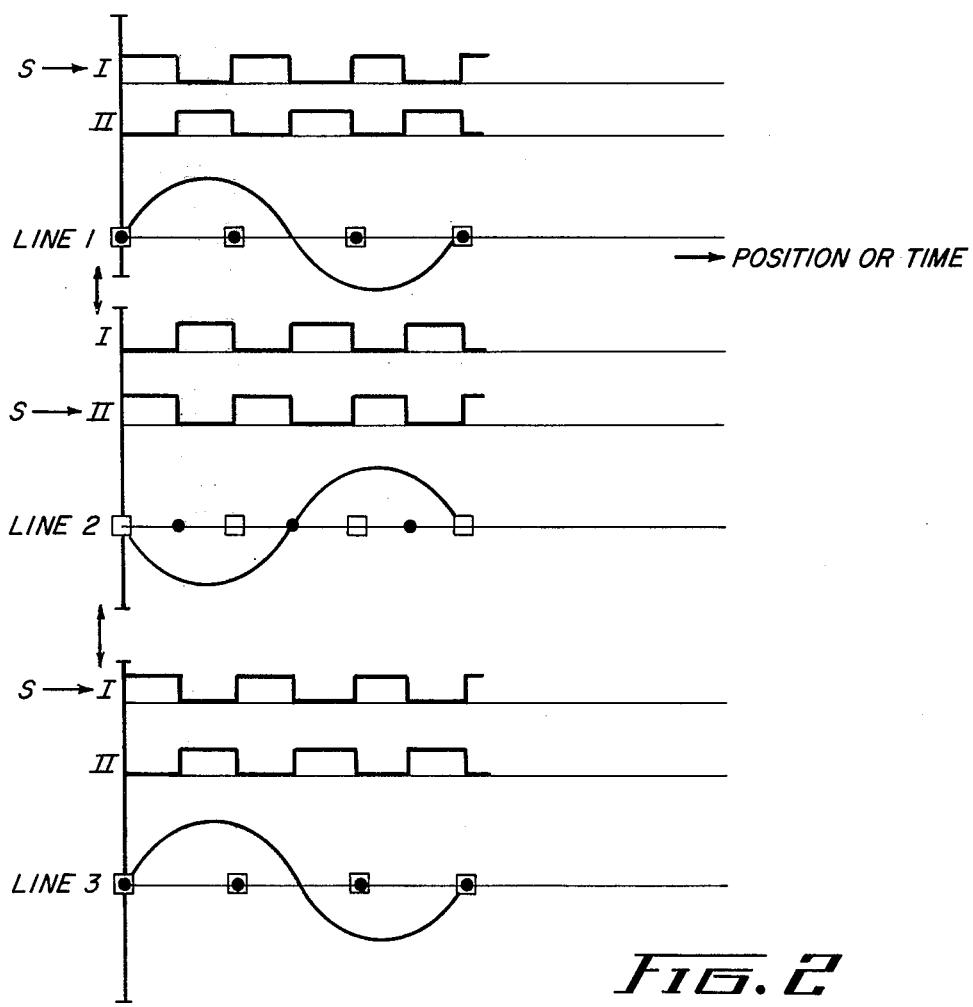
FIG. 2 is a graph of subcarrier signals showing sampling points which is useful in describing the problem solved by the invention and the technique of solution.

The graphs of FIG. 1 and FIG. 2, in part, are useful in understanding the problem of misalignment of samples when an NTSC television signal is digitally encoded at an odd multiple of the color subcarrier frequency, such as 10.74 MHz. The sine waves shown in both the FIGURES are representative of the color subcarrier signal at the beginning of the active picture area of the first three time sequential horizontal lines. The sine waves can therefore be considered as occuring at the NTSC color subcarrier frequency of 3.58 MHz. It will be understood that these sine waves are not intended to depict the actual television signal to be sampled, but are illustrative of the principle involved. In the graph of FIG. 1 it is assumed that digital samples are taken at the rate of 14.32 MHz. or four times the color subcarrier frequency. In this case, the sampling points, as represented by the large dots in the figure, can be seen to be spatially aligned on successive video scanlines. The samples, taken at the 14.32 MHz. rate, are nominally 70 nanoseconds apart and can be visualized as being taken on each scanline at reference points designated 0°, 90°, 180°, and 270°, there being four samples taken during each period of the color subcarrier signal. As is well known, the color subcarrier frequency is an odd multiple of one-half the horizontal line rate, and this accounts for the sine wave of line 2 starting with a negative-going waveform whereas the sine waves of lines 1 and 3 start with positive-going waveforms. Notwithstanding this factor, the samples are seen to align spatially on successive lines, a result which follows from the even multiple relationship between the subcarrier frequency and the sampling frequency.

The large dots in FIG. 2, on the other hand, show the misalignment that tends to occur when sampling is done at an odd multiple of the color subcarrier frequency, for example, 10.7 MHz. In this case, the samples are taken 93 nanoseconds apart and three samples are taken during each period of color subcarrier. The samples of each of the lines 1, 3, 5 . . . can be visualized as being taken at the graphical points 0°, 120°, 240°, etc., while the samples on each of the lines 2, 4, 6 . . . can be thought of as being taken at the graphical points 60°, 180°, 300°, etc. This notation is best understood by considering the first positional picture element on each horizontal line as having positional reference angle of 0° and considering the elemental length scanned during each color subcarrier period as encompassing 360°, or a full "positional" cycle. Accordingly, each full positional cycle is equivalent to the elemental length scanned during 279 nanoseconds; i.e. one period of color subcarrier.

FIG. 3 shows an embodiment of an encoding apparatus in accordance with the invention. An NTSC video signal, in analog form, is received on a line 20 and coupled to an analog-to-digital converter (ADC) 30 which, in the present embodiment, is a PCM modulator. The PCM modulator samples the analog video signal under control of a sampling signal on a line 21 which is the output of a semiconductor switch 25. The 10.7 MHz. sampling signal is generated by a voltage controlled oscillator 40 which is locked to a three times multiple of the subcarrier frequency by a conventional phase-locked loop comprising frequency divider 50 and phase detector 60. A color burst separator 70 separates the color burst from the composite video signal. The color burst signal and the output of frequency divider 50 are compared by phase detector 60 that generates an error singal which, in turn, corrects any deviation of the 10.74 MHz. oscillator from its desired three times relationship with the color subcarrier. The output of oscillator 40 is also coupled to a phase splitter 80 which generates a pair of square wave outputs at the frequency of 10.7 MHz., the outputs being 180° out of phase and designated by the numerals I and II. These two square waves are made available at switch 25 and are alternately utilized as sampling signals for successive horizontal lines of the television field. This is achieved by using the horizontal sync signal, obtained by sync separator 90, to control the switch 25 which alternates between sampling sources in the manner of a flip-flop. The switch 25 is preferably synchronized to switch prior to the color burst during horizontal blanking.

The use of oppositely phased sampling signals on successive horizontal scanlines can be seen to eliminate the problem of misaligned digital samples as is illustrated from the square waveforms and the small boxes (which represent the sampling points obtained using the invention) of FIG. 2. Assuming that the modulator samples at every positive-going transition of the sampling square wave, it can be seen that the sampling points represented by the small boxes on each axis are obtained by using sampling signal I on line 1, using sampling signal II on line 2, and using sampling signal I on line 3, this selection being illustrated by the arrow S in each case. The square wave I and II are seen to alternate in phase on successive scanlines (as does the subcarrier signal), so by selecting alternate square waves as sampling signals on successive lines, the desired aligned sampling points are obtained. In this manner, it is seen that the output of ADC 30 is a digitally encoded NTSC signal that can be readily comb filtered.

We claim:

1. Apparatus for digitally encoding an NTSC color television signal, comprising:
    means for generating a first sampling signal having a characteristic frequency of three times the NTSC color subcarrier signal;
    means for generating a second sampling signal having a characteristic frequency of three times the NTSC color subcarrier signal, said second sampling signal having its sampling reference points interspersed equally in time between the sampling reference points of said first sampling signal;
    enabling means responsive to the NTSC color television signal for alternately enabling said first and second sampling signals during successive horizontal scanlines of said television signal;
    means responsive to the enabled sampling signal for sampling the television signal; and
    means for converting the sampled television signal into digital form.

2. An apparatus as defined by claim 1 wherein said first and second sampling signals are opposite phases of a square wave.

3. An apparatus as defined by claim 2 wherein said means for converting the sampled television signal into digital form is a PCM modulator.

4. A method of digitally encoding an NTSC color television signal, comprising the steps of:
  generating a first sampling signal having a characteristic frequency of three times the NTSC color subcarrier signal;
  generating a second sampling signal having a characteristic frequency of three times the NTSC color subcarrier signal and having its sampling reference points interspersed equally in time between the sampling reference points of said first sampling signal;
  alternately enabling the first and second sampling signals during successive horizontal scanlines of the television signals;
  sampling the television signals in response to the enabled sampling signal; and
  converting the sampled television signal into digital form.

* * * * *